G. W. KEPLER.
TEMPERATURE COMPENSATING DEVICE FOR SCALES.
APPLICATION FILED AUG. 21, 1919.
1,366,670.
Patented Jan. 25, 1921.
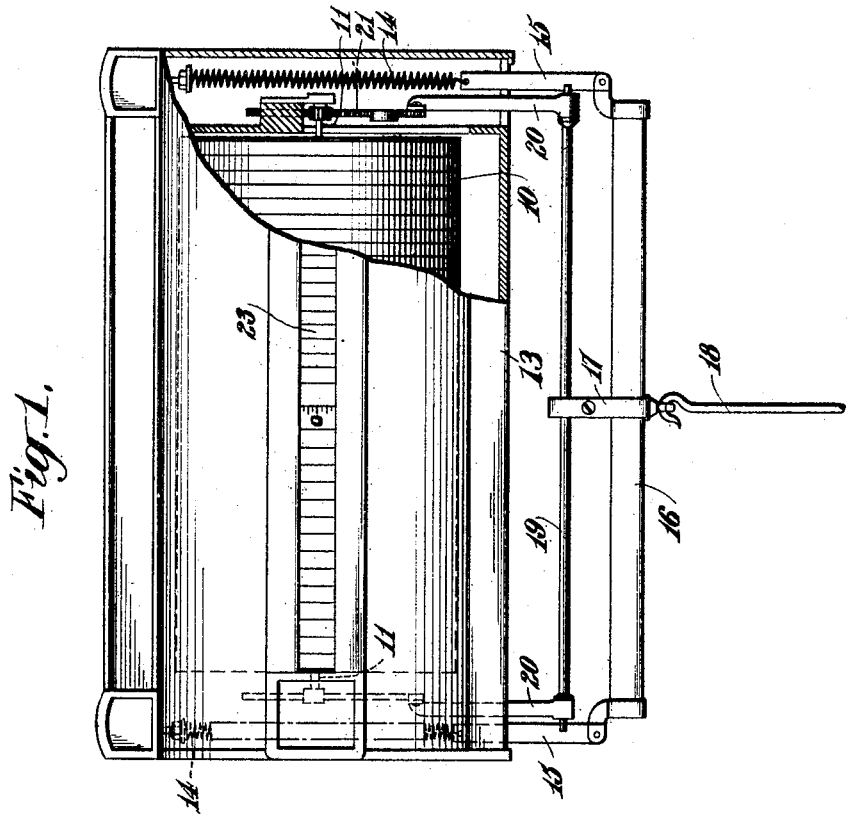
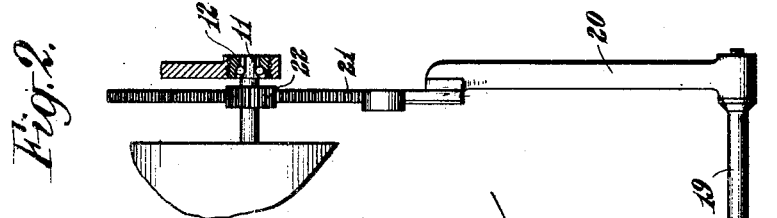
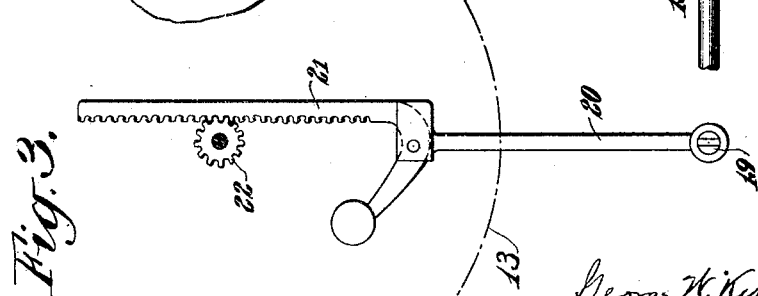
George W. Kepler
INVENTOR
BY
Kerr, Page, Cooper & Hayward
his ATTORNEYS

UNITED STATES PATENT OFFICE.

GEORGE W. KEPLER, OF DAYTON, OHIO, ASSIGNOR TO THE COMPUTING SCALE COMPANY, OF DAYTON, OHIO, A CORPORATION OF OHIO.

TEMPERATURE-COMPENSATING DEVICE FOR SCALES.

1,366,670.  Specification of Letters Patent.  Patented Jan. 25, 1921.

Application filed August 21, 1919. Serial No. 318,879.

*To all whom it may concern:*

Be it known that I, GEORGE W. KEPLER, a citizen of the United States of America, residing at Dayton, in the county of Montgomery and State of Ohio, have invented certain new and useful Improvements in Temperature-Compensating Devices for Scales, of which the following is a full, clear, and exact description.

In weighing scales in which the load to be weighed, or in which a portion of the scale mechanism, is counterbalanced, in whole or in part, by one or more springs, the effect of temperature changes has an important influence upon the accuracy or correctness of the scale. As the temperature to which the scale is subjected rises, the springs become softer or more easily flexed or elongated, and as the temperature falls the springs become stiffer or less easily elongated. Hence when the scale is cold a given mass will appear to have less weight than when the scale is warm, thus destroying what for convenience may be termed the "weighing balance." Moreover, the springs expand or increase in length with rising temperature and contract or decrease in length with falling temperature. In scales of the computing and indicating types, in which the value of the commodity or its weight, or both, are indicated on or by a part which is moved by the scale parts, indicating devices should indicate zero when no load is on the scale. This is known as "zero balance." If the springs and coöperating parts are designed for correct zero balance at one temperature, at a higher or lower temperature the zero balance will be destroyed due to the elongation or contraction of the springs. It is therefore customary to equip the scale with a thermostatic device or devices by which compensation is made for the effects of temperature changes. In some cases the same thermostat or thermostatic mechanism takes care of both weighing balance and zero balance, while in others separate devices are provided. In the latter class, in which, as a rule, coil or helical springs arranged vertically are used, one of the most satisfactory methods for correcting zero balance is to attach the fixed end of the spring, usually the upper end, to a member which expands or contracts (as the temperature varies) to the same extent as the spring but in the opposite direction. Then as the spring expands, which would cause the lower end of the spring to descend, the entire spring is lifted by an equal amount. Conversely, as the spring contracts, tending to raise the lower end, the entire spring is lowered. In each case the lower end of the spring is maintained at a constant position when there is no load on the scale.

My present invention relates chiefly to scales of the class last referred to, but I do not associate the compensating device with the springs. Instead, I connect the compensating device with the parts which actuate the indicating mechanism; and in the type of scales in which the indicating mechanism is actuated by a rack and pinion and in which the rack is shifted in one direction by the load I make the compensating device a part of the mechanical connection between the rack and the platform, scalepan or other support on which the load is placed for weighing. My compensating device thus serves two purposes, and I am therefore able to dispense with at least one part of the scale apparatus, namely, the expansible and contractible part heretofore employed as a support for the fixed end of the spring.

One embodiment of my invention is illustrated in the accompanying drawing, in which—

Figure 1 is a front view, partly in section, showing a computing scale of the so-called drum or barrel type.

Fig. 2 is a detail front view, on a larger scale, of the indicating mechanism actuating devices, showing the temperature-compensating member as a part of the latter.

Fig. 3 is a detail side view of the devices shown in Fig. 2.

The indicating and computing drum or barrel 10 is provided with axial journals 11 mounted in ball bearings, as 12, Fig. 2, so as to rotate with minimum friction, and is inclosed in a cylindrical housing 13 which carries the said bearings and is supported in any convenient manner, being either suspended from a hook or mounted on a standard or pedestal, not shown.

The coil springs 14, at the ends of the housing, are suspended from their upper ends and at their lower ends are connected to links 15 which are in turn connected to a transverse member 16. The latter may be and preferably is a thermostat of the type described in the patent of A. N. Ozias, No. 776,754, to maintain correct weighing balance at different temperatures. The member 16 carries at its center a yoke 17, connected by a draft rod 18 to the scalepan, platform, or other support, not shown, for the goods which are to be weighed. It will be understood that the weight of the goods is transmitted through the draft rod 18, thermostat 16 and links 15 to the springs 14 and elongates or stretches the latter to an extent proportionate to the weight.

The yoke 17 carries a transverse bar 19, which may be slotted at its ends to embrace loosely the links 15 and is connected at its ends to the lower ends of two upwardly extending members 20. At their upper ends the latter carry vertical racks 21 arranged to mesh with pinions 22 fixed on the drum-journals or spindles 11. It will therefore be seen that as the draft rod 18 and yoke 17 are drawn down by the load the racks 21 are also drawn down, thereby rotating the drum and carrying its weight-graduations and value-graduations past the index-line 23. In effect the lower ends of the springs and the lower ends of the rack-supporting members 20 are connected together; and if the spring lengthens or shortens by reason of expansion or contraction due to change of temperature, the racks will be moved down or up correspondingly, thereby giving the drum a slight movement so that the zero graduations thereon no longer stand at the index-line when there is no load on the goods-support.

According to my invention I make the members 20, which connect the racks 21 to the rod 19, of such material, for example zinc, and of such length, that they will lengthen and shorten at the same rate as the springs under variation of temperature. The result then is that as the springs lengthen downwardly, thereby lowering the rod 19 and zinc connecting members 20, the racks are nevertheless raised by an equal amount; and as the springs shorten, upwardly, thereby raising the rod 19 and members 20, the racks are lowered to the same extent. Consequently there is no movement of the drum as the temperature varies; and this in spite of the fact that the upper ends of the springs are fixed and do not move up or down with temperature changes. At the same time the members not only serve to compensate for the varying length of the springs but they also serve a purely mechanical function as a part of the connection between the racks and the draft rod 17, which latter may here be considered to represent the support for the goods to be weighed.

It is to be understood that the invention is not limited to the specific construction but can be embodied in other forms and can be applied to other types of scales without departure from its spirit.

I claim:

1. In a weighing scale, the combination with indicating mechanism, a load-support, a counterbalancing spring, and a connection between the load-support and the spring, said connection including a temperature responsive device adapted to compensate for changes in the flexibility of the spring at varying temperatures and to maintain correct weighing balance at said varying temperatures, of connecting means between the load-support and the indicating mechanism, including a thermostatic member constituting a part of said connecting means and also serving to maintain zero-balance of the indicating mechanism as the spring is altered in length by temperature changes.

2. In a weighing machine, the combination with indicating mechanism, a load-support, a counterbalancing spring, and a connection between the load-support and the spring, said connection including a temperature responsive device adapted to compensate for changes in the flexibility of the spring at varying temperatures and to maintain correct weighing balance at said varying temperatures, of an actuating connection between the load-support and the indicating mechanism, including a temperature-responsive device arranged to prevent displacement of the indicating mechanism by change in the length of the spring as the temperature varies.

3. In a weighing scale, the combination with an indicating device, a load-support, a counterbalancing spring, and a connection between the spring and the load-support, said connection including a temperature responsive device adapted to compensate for changes in the flexibility of the spring at varying temperatures and to maintain correct weighing balance at said varying temperatures, of a pinion connected with the indicating device to actuate the same, a rack meshing with the pinion to rotate the same, and a temperature-responsive member alined with and carrying the rack and connected with the load-support to reciprocate the rack and thereby rotate the pinion in harmony with the movement of the load-support, said member being also adapted by its own contraction and expansion to prevent movement of the rack by change in the length of the spring due to temperature change.

4. In a weighing scale, in combination, an indicating device, a pinion connected with the indicating device to actuate the same, a reciprocating rack meshing with the pinion to rotate the same, a load-support, a helical-spring connected with the load-support, and a zinc rod alined with and carrying the rack and connected with the load support to reciprocate the rack in harmony with the movement of the load-support, said rod being adapted by its own contraction and expansion to prevent displacement of the rack by the shortening and lengthening of the spring caused by variation of temperature.

5. In a weighing scale, in combination, an indicating drum, pinions at the ends of the drum to rotate the same, racks meshing with the pinions to rotate the same, an extensible and contractible counterbalancing spring, a load-support connected with the spring, a transverse member connected with the load support and movable therewith, and a pair of temperature-responsive rods connected at their ends to the racks and to the transverse member to reciprocate the racks in harmony with the movement of the load-support, and adapted by their own expansion and contraction to prevent shifting of the racks by the change in the length of the springs due to change in temperature.

6. In a weighing scale, in combination, a horizontal indicating drum, pinions at the ends of the drum to rotate the same, vertical racks meshing with the pinions to rotate the same, helical counterbalancing springs arranged vertically at the ends of the drum and supported at their upper ends, a load-support connected to the lower ends of the springs, a horizontal member connected with the load-support below the racks, and zinc members of elongated form extending upwardly from the said transverse member and at their upper ends connected with the racks to reciprocate the latter, said zinc members serving by their own contraction and expansion to prevent displacement of the racks by change in the length of the springs as the temperature varies.

In testimony whereof I hereunto affix my signature.

GEORGE W. KEPLER.